United States Patent
Lee et al.

(10) Patent No.: US 8,833,959 B2
(45) Date of Patent: Sep. 16, 2014

(54) DISPLAY ARRANGEMENT WITH OPTICAL STRUCTURE FOR REDUCING HALO EFFECT

(75) Inventors: Hsin Chin Lee, Waterloo (CA); Antanas Matthew Broga, Cambridge (CA); Ka Ho Liu, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 206 days.

(21) Appl. No.: 13/364,983

(22) Filed: Feb. 2, 2012

(65) Prior Publication Data
US 2013/0201692 A1 Aug. 8, 2013

(51) Int. Cl.
*G09F 13/08* (2006.01)

(52) U.S. Cl.
USPC .... 362/97.4; 362/97.1; 362/97.2; 362/311.01

(58) Field of Classification Search
USPC ...................... 362/97.1–97.4, 311.01, 311.13
See application file for complete search history.

(56) References Cited

U.S. PATENT DOCUMENTS

| | | | |
|---|---|---|---|
| 4,729,640 A | 3/1988 | Sakata | |
| 5,299,037 A | 3/1994 | Sakata | |
| 5,477,351 A | 12/1995 | Takahara et al. | |
| 5,486,940 A | 1/1996 | Fergason et al. | |
| 5,648,859 A | 7/1997 | Hirabayashi et al. | |
| 6,290,364 B1 | 9/2001 | Koike et al. | |
| 6,292,240 B1 | 9/2001 | Kamiya et al. | |
| 6,450,678 B1 | 9/2002 | Bayersdorfer | |
| 6,473,220 B1 | 10/2002 | Clikeman et al. | |
| 6,906,348 B2 | 6/2005 | Sugiura | |
| 6,972,827 B2 | 12/2005 | Mi | |
| 7,142,767 B2 | 11/2006 | Gardiner | |
| 7,227,669 B2 | 6/2007 | Loce et al. | |
| 7,248,394 B2 | 7/2007 | Ding et al. | |
| 7,365,814 B2 | 4/2008 | Kang | |
| 7,693,389 B2 | 4/2010 | Kamijima | |
| 7,986,451 B2 | 7/2011 | Gally et al. | |
| 2004/0254716 A1 | 12/2004 | Ino et al. | |
| 2006/0089732 A1 | 4/2006 | Range | |
| 2006/0123678 A1 | 6/2006 | Arvin | |

(Continued)

FOREIGN PATENT DOCUMENTS

| DE | 10 2008 036531 A1 | 2/2010 |
|---|---|---|
| FR | 2961335 A1 | 12/2011 |

OTHER PUBLICATIONS

Extended European Search Report Issued Jun. 1, 2012 in respect of European Patent Application No. 12153594.2.

(Continued)

*Primary Examiner* — Meghan Dunwiddie
(74) *Attorney, Agent, or Firm* — Bereskin & Parr LLP

(57) ABSTRACT

A display arrangement includes a decoration layer, a light source underneath the decoration layer, and a lens layer arranged between the decoration layer and the light source. The decoration layer includes at least one void formed in the shape of a character when viewed from above. The lens layer is at least semi-transparent to permit transmission of light from the light source through the void. An optical structure is arranged in alignment with the void and is adapted to reduce intensity of the light in a peripheral region of the void so as to reduce a halo effect. The decoration layer may be formed as an external layer of a key or a button of a portable electronic device, or an outer casing of a portable electronic device.

12 Claims, 6 Drawing Sheets

(56) References Cited

U.S. PATENT DOCUMENTS

| | | |
|---|---|---|
| 2006/0221629 A1 | 10/2006 | Seong et al. |
| 2008/0259250 A1 | 10/2008 | Kleverman et al. |
| 2009/0015539 A1 | 1/2009 | Rumreich et al. |
| 2009/0109703 A1 | 4/2009 | Chen et al. |
| 2009/0322800 A1 | 12/2009 | Atkins |
| 2010/0110724 A1 | 5/2010 | Moncrieff |
| 2010/0309551 A1 | 12/2010 | Whitney |
| 2011/0025725 A1 | 2/2011 | Hulze |
| 2011/0193870 A1 | 8/2011 | Kerofsky |
| 2011/0227487 A1* | 9/2011 | Nichol et al. ............ 315/158 |

OTHER PUBLICATIONS

Examination Report issued Sep. 11, 2013 in respect of European Patent Application No. 1253594.2.

* cited by examiner

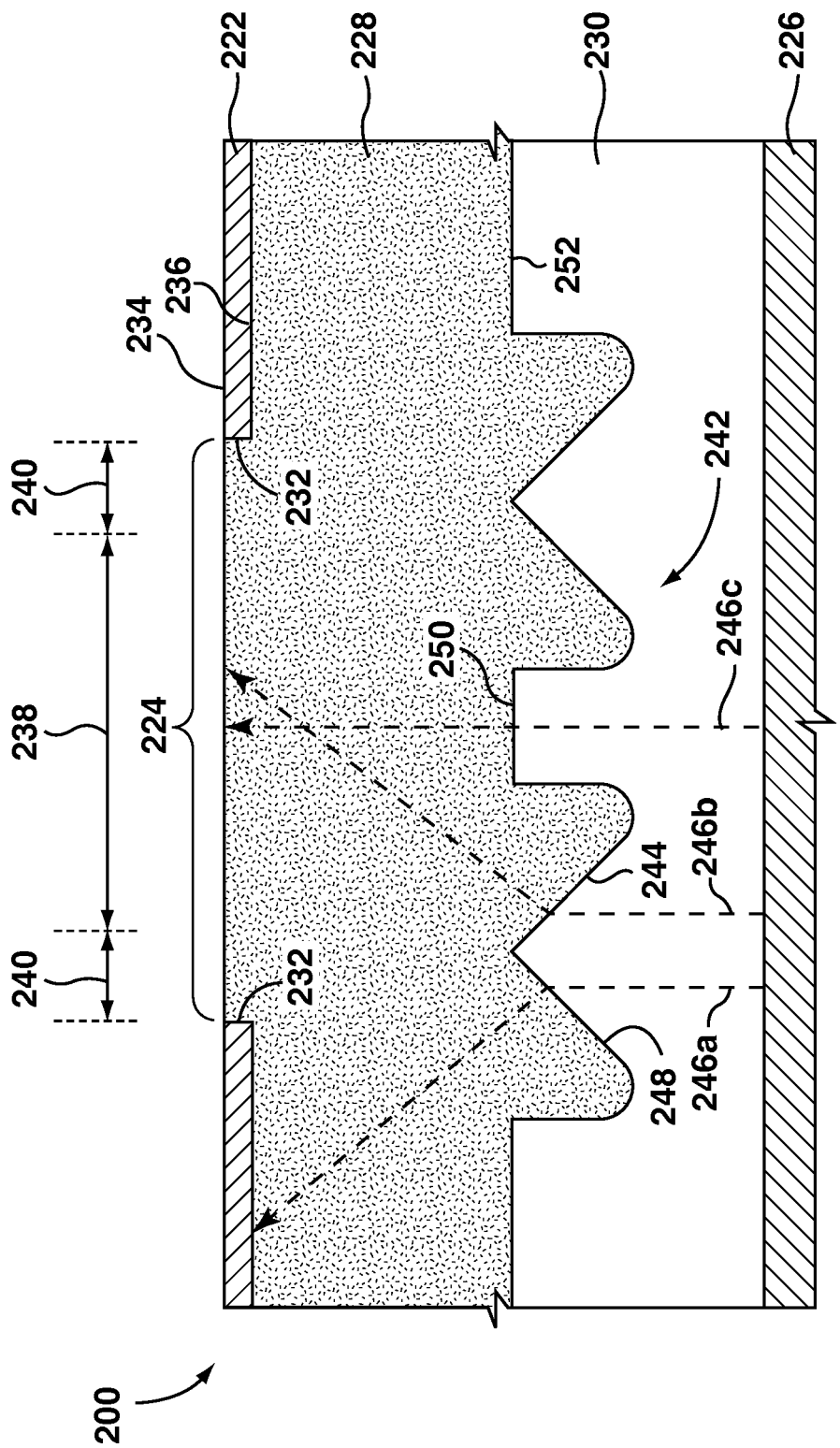

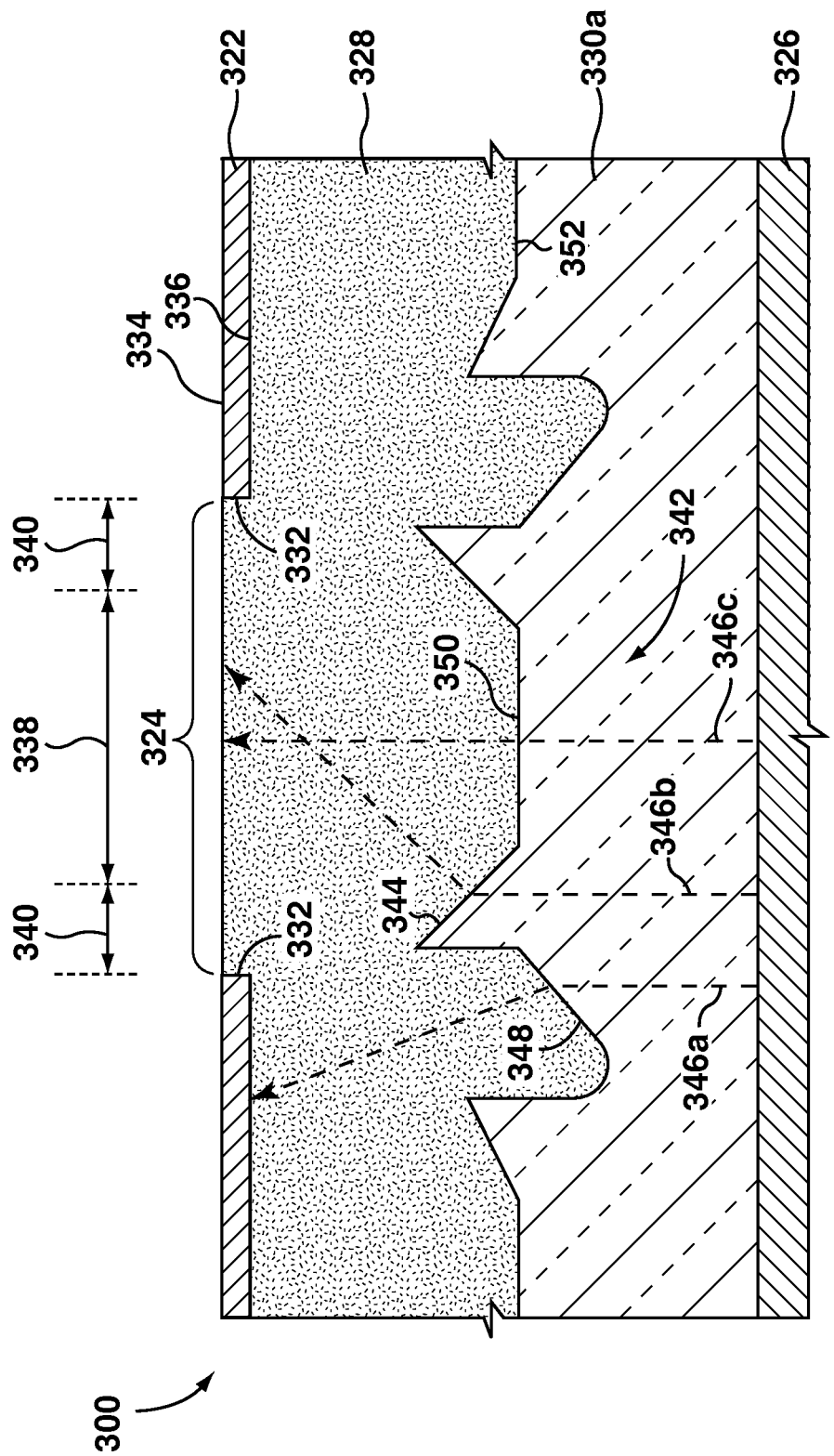

DISPLAY ARRANGEMENT WITH OPTICAL STRUCTURE FOR REDUCING HALO EFFECT

TECHNICAL FIELD

The present disclosure relates to display devices, and in particular to backlight display arrangements, such as those for portable electronic devices.

INTRODUCTION

Numerous electronic devices of many sizes, shapes, configurations and functionalities use buttons, keys, touch screens or other input devices that may be responsive to a touch or press or other action by a user. Such input devices may convey visual information, such as information pertaining to function. For example, a button that conveys a delete command may be marked with "DEL," or a key that terminates or disconnects a telephone call may be marked with a symbol that represents that function.

In addition, numerous electronic devices may include features such as logos, trademarks, annunciators or indicators that may convey information with or without user input. It is generally desirable that a user be able to see the visual information being conveyed. To improve visibility, the information may be illuminated with a light source and one or more transflective components. The term "transflective" refers to the ability to both transmit and reflect light. Electronic components that can be so illuminated may be referred to generally as display arrangements.

Transflective components, which may include information like characters or symbols on the buttons of a device, help make the information more readily visible. Display arrangements having transflective components may present information more readily viewable (and more readily discernable under a variety of ambient lighting conditions) than components that have information merely painted on or printed on or embossed or engraved. Under bright illumination (e.g., when exposed to daylight), transflective characters on the buttons may act mainly as reflective components, whereas in dim or dark ambient situations a transmissive backlight mechanism may be provided for illuminating the characters.

SUMMARY

The following summary is intended to introduce the reader to the detailed description that follows and not to define or limit the claimed subject matter.

In an aspect of the present disclosure, a display arrangement may include a decoration layer including a top surface, a bottom surface, and at least one void between the top and bottom surfaces; a light source arranged underneath the bottom surface of the decoration layer, the light source adapted to transmit light through the void; and a lens layer arranged generally between the decoration layer and the light source, the lens layer being at least semi-transparent to permit transmission of the light through the void, the lens layer including an optical structure arranged in alignment with the void.

The optical structure may be adapted to reduce intensity of the light in a peripheral region of the void by directing light away from the peripheral region. The optical structure may include at least one angled face arranged to refract the light away from the peripheral region.

The optical structure may be adapted to reduce intensity of the light in a peripheral region of the void by directing light towards a central region of the void. The optical structure may include at least one angled face arranged to refract the light towards the central region.

In some aspects, the optical structure may include a central planar section, in some cases in combination with one or more angled faces.

The optical structure may be adapted to reduce intensity of the light in a peripheral region of the void by directing the light towards the bottom surface of the decoration layer. The optical structure may include at least one angled face arranged to refract the light towards the bottom surface of the decoration layer.

The optical structure may be adapted to reduce intensity of the light in a peripheral region of the void by directing the light towards a central region of the void and towards the bottom surface of the decoration layer. The optical structure may include at least one angled face arranged to refract the light towards the central region, and at least one angled face arranged to refract the light towards the bottom surface of the decoration layer.

The arrangement may include a gap layer arranged between the light source and the lens layer. The gap layer may be formed of air, an adhesive, or a combination thereof.

The light source may include at least one of: at least one light emitting diode and a light guide connected to the at least one light emitting diode; and an electroluminescent panel.

The decoration layer may be formed as an external layer of a key or a button of a portable electronic device (or both). The decoration layer may be formed as an external layer of an outer casing of a portable electronic device.

In another aspect of the present disclosure, a display arrangement may include: a decoration layer having at least one void formed in the shape of a character when viewed from above; a light source arranged underneath the decoration layer, the light source adapted to transmit light through the void to backlight the character; a lens layer arranged above the light source, the lens layer being at least semi-transparent to permit transmission of the light through the void; and an optical structure arranged in alignment with the void, the optical structure having at least one angled face sized and shaped to refract the light to reduce intensity of the light in a peripheral region of the void.

In another aspect of the present disclosure, a portable electronic device may include: a decoration layer formed as an external layer of at least a portion of the portable electronic device, the decoration layer having a top surface, a bottom surface, and at least one void between the top and bottom surfaces, the void formed in the shape of a character when viewed from above the top surface; a light source arranged underneath the bottom surface of the decoration layer, the light source adapted to transmit light through the void to backlight the character; and an optical structure arranged generally between the decoration layer and the light source and in alignment with the void, the optical structure sized and shaped to reduce intensity of the light in a peripheral region of the void.

BRIEF DESCRIPTION OF THE DRAWINGS

The drawings included herewith are for illustrating various examples of apparatuses and methods of the present disclosure and are not intended to limit the scope of what is taught in any way. In the drawings:

FIG. 7 is schematic, sectional view of a display arrangement according to another example; and FIG. 8 is schematic, sectional view of a display arrangement according to yet another example.

DETAILED DESCRIPTION

Figure 1:
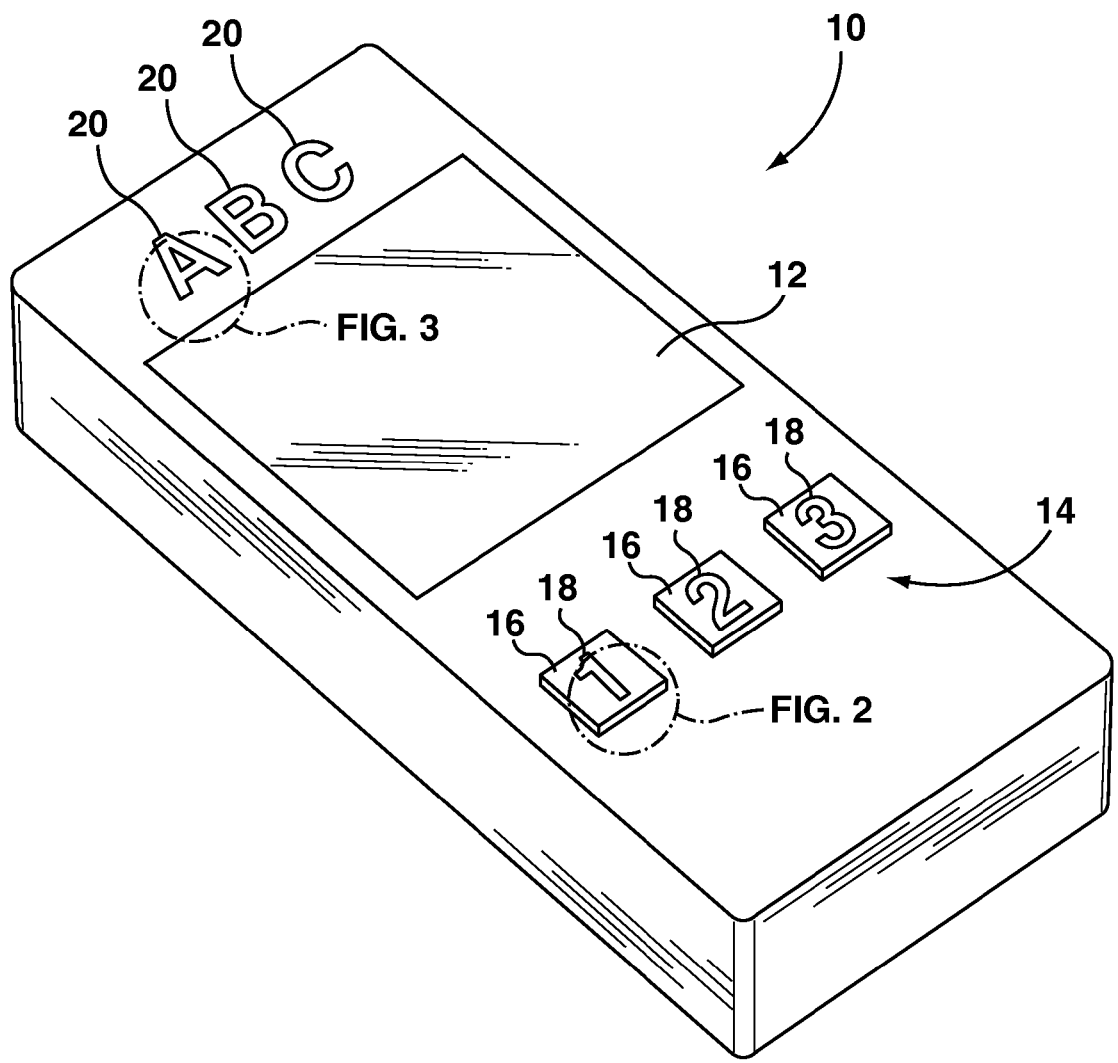
FIG. 1 is perspective view of a portable electronic device according to one exemplary embodiment.

In the following description, specific details are set out to provide examples of the claimed subject matter. However, the examples described below are not intended to define or limit the claimed subject matter. It will be apparent to those skilled in the art that variations of the specific examples may be possible within the scope of the claimed subject matter. In other instances, known apparatuses and methods have not been described in detail so as not to obscure the examples described herein.

For simplicity and clarity of illustration, where considered appropriate, reference numerals may be repeated among the drawings to indicate corresponding or analogous elements or steps.

In general, the concepts described herein pertain to display arrangements (including but not limited to buttons, keys and annunciators) that may present visual information (such as characters or symbols) with the assistance of illumination. More particularly, the concepts are directed to backlight display arrangements, that is, display arrangements that may be illuminated with a light source that is in "back" of or "behind" or "beneath" or "underneath" one or more portions of the display arrangement that the user could ordinarily see. It may be said that the user viewing the display arrangement would ordinarily be viewing from the "front", "above", or "overhead"; and that a first element interposed between the user and a second element is "above" the second element, or that the second element is "underneath" the first element, and so on.

In general, one of the potential benefits that may be realized through implementation of one or more of the concepts as described herein is that the information may be easier for a human being to read under a variety of conditions, particularly in different lighting conditions. The visual information may be, for example, sharper, or more distinct, or have greater visibility of detail. The brightness and contrast may be enhanced, and in general the visual information may be more readily legible, recognizable or identifiable. In addition, aesthetic qualities may be improved. Colloquially speaking, the visual information may be easier to see, and may look more pleasing.

One illustrative context in which it may be important for visual information to be readily legible, recognizable or identifiable is the context of a portable electronic device. Portable electronic devices have gained widespread use and may provide a variety of functions including, for example, telephonic, electronic text messaging and other personal information manager application functions. Portable electronic devices may include several types of devices such as cellular phones, smart phones, personal digital assistants (PDAs), remote controls, portable media players (such as music players or DVD players), laptop computers, and tablet computers.

Many portable electronic devices are handheld, that is, sized and shaped to be held or carried in a human hand. With portable electronic devices in general, and handheld devices in particular, considerations of space and miniaturization may weigh in favor of economical use of space. It may therefore be advantageous to be able to present visual information in a smaller space while still having the visual information be readily legible, recognizable or identifiable.

Importantly, the concepts as described herein are not strictly limited to portable electronic devices or handheld devices. Specifically, the concepts may be useful in any variety of contexts in which visual information may be presented, such as control consoles or instrumentation, on electronic devices (e.g. a television, a personal computer, etc.), in an automotive application, and so on. The concepts may be especially useful for portable electronic devices, however, and so for purposes of illustration, the concepts will be further explained in the context of a portable electronic device.

Referring now to FIG. 1, a portable electronic device is shown at reference numeral 10. In the example illustrated, the portable electronic device 10 has a unibody shape, although in other examples other shapes of portable electronic devices may be used (such as a "clamshell" or "flip-phone" style, or a "slider"). A front side of the portable electronic device 10 may include a display 12, which may be an LCD display, an OLED display, and so on. Optionally, in some examples, the display 12 may be a touch-sensitive display.

In the example illustrated, the front side of the portable electronic device 10 also includes two examples of a display arrangement. One of the display arrangements is in the form of a keypad 14, which may include a plurality of alphanumeric keys or buttons 16, and which (as shown) may be arranged in a plurality of rows and columns. For clarity of illustration, the keypad 14 is shown to include only three keys 16, with "1", "2" and "3" arranged as characters 18 thereon, although in some examples many more keys may be present. The characters 18 may be transflective.

Although the numbers "1", "2" and "3" are illustrated, in various examples the characters 18 may be symbols, logos, annunciators or other graphical designs, or any combination thereof. For instance, in some examples, the characters 18 may represent the alphabet and the keys 16 may be arranged according to a standard keyboard layout (e.g., QWERTY, QWERTZ, DVORAK, etc.).

In other examples, the characters 18 may be symbols that represent a dedicated function for the particular key 16 (e.g., a dedicated phone application button, a dedicated "disconnect call" button, a home screen button, etc.) Various key configurations are generally possible. Further, the keys 16 need not be raised from the surface of the body of the device 10 as depicted in FIG. 1. The keys 16 may be recessed, for example, or flush with the surface of the body, or pitched or shaped in different ways.

In the example illustrated, the front side of the portable electronic device 10 further includes another example of a display arrangement, embodied as characters 20 located on a portion of the body of the portable electronic device 10 above the display 12. For clarity of illustration, only three characters 20 are shown, namely "A", "B" and "C", although in other examples more characters may be present. The characters 20 may be transflective.

In some examples, the characters 20 may be logos, model names/numbers, trademarks, annunciators or other indicators to be displayed on the exterior of the portable electronic device 10.

The display arrangements of the keys 16 and the characters 20 are not the only kinds of display arrangements that are possible, but these two display arrangements illustrate that the concepts described herein may be applicable to a variety of uses, functions and contexts.

Notably, in the case of the keys 16, a user might be expected to interact with the keys 16 such as by pressing, touching, swiping or otherwise interacting with the keys 16 as an input device. In contrast, a user might not be expected to use the characters 20 as an input device.

Although not shown, the portable electronic device 10 may include an auxiliary input device that responds to user interaction, and which may be used for navigating around the display 12, to select objects on the display 12, or for other purposes. One or more input or output ports, such as power input port, a microUSB port, or an audio jack may also be provided.

The portable electronic device 10 may further include other input devices which could be used for navigation, to control volume, to launch a particular application, or for other functions. In various examples, these input devices may include optical sensors, mechanical buttons, or both.

The portable electronic device may yet further include a portable power pack, such as a battery, that supplies electrical power to various power-consuming components in the device, including one or more light sources that may illuminate the display arrangements.

Figure 2:
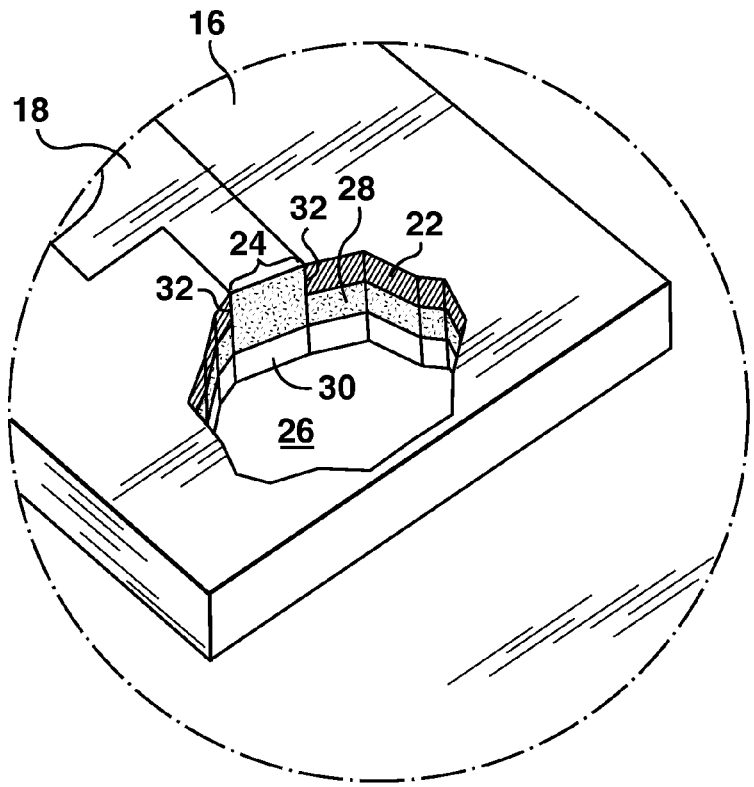
FIG. 2 is a cutaway, detailed view of the portable electronic device of FIG. 1.
Figure 3:
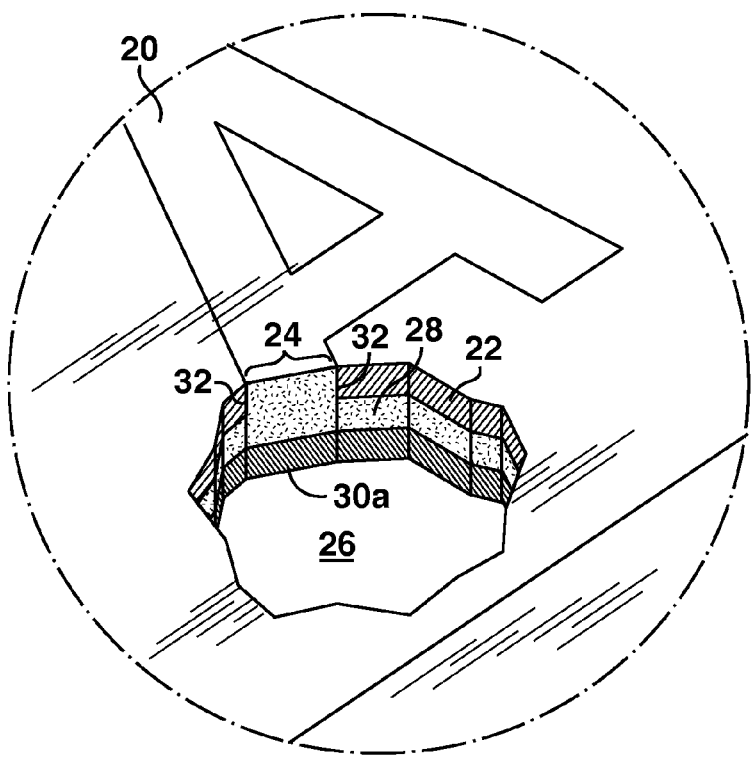
FIG. 3 is another cutaway, detailed view of the portable electronic device of FIG. 1.

Referring now to FIGS. 2 and 3, some details of a construction of a display arrangement are shown. A display arrangement may include a decoration layer 22. The decoration layer 22 may be arranged as at least a portion of the portable electronic device 10, and in some examples, may be arranged as an external layer thereof. In particular, in FIG. 2 the decoration layer 22 is formed as an external layer of the key 16, whereas in FIG. 3 the decoration layer 22 is formed as a layer of the casing of the portable electronic device 10.

The decoration layer 22 is at least partially opaque, and in some examples is substantially or fully opaque.

Voids 24 in the decoration layer 22 allow light to be transmitted from a light source 26 positioned behind the decoration layer 22. This light source 26 functions as a backlight for the decoration layer 22 of the characters 18, 20, for example. The voids 24 may be, but need not be, holes devoid of solid material, or may include holes devoid of solid material in addition to solid material. For simplicity, the voids 24 may be described as including the material that is used for the lens layer 28, as discussed below. The voids 24 constructed of solid material may offer benefits of durability and resistance to contamination, and may also support modification of the light transmitted through the void (e.g., by filtering the light passing through so that the light emerging from the void appears to be a particular color).

The light source 26 is adapted to transmit light—either light generated by the light source 26 itself or received from elsewhere (or both)—through the void 24. The light source 26 need not transmit collimated light, but in general, the light source 26 may transmit light in the general direction of the void 24.

In some examples, the light source 26 may include a combination of at least one light emitting diode (LED) and a light guide connected to the LED. Generally speaking, light guides may spread light from a light source, or direct light from a light source to a destination, or both. In other examples, the light source 26 may include an electroluminescent (EL) panel. In other examples, the light source 26 may be other light sources that generate and/or transmit light through the voids 24.

Although a common reference numeral is used, the light source 26 used as a backlight for one or more features (e.g., the characters 18) need not be the same as for other features (e.g., the characters 20). In some examples, the light source 26 may be composed of several individual light sources, which may illuminate in concert.

In examples where the characters 18 or the characters 20 are transflective, the light source 26 may also be configured to reflect light that the light source 26 itself did not generate. For example, the light source 26 may include a reflective layer that receives light from a source external to the device 10 (such as the sun or ambient light) and directs the received light to the void 24.

Thus, in some examples, the light source 26 may operate either actively by transmitting light (generated by the light source 26 itself) through the voids 24 to backlight the characters 18, 20, or passively by reflecting incoming light (generated by something other than the light source 26 itself) through the voids 24. It is also possible that the light source 26 may operate both actively and passively. Regardless of where the light is generated, light from the light source 26 is transmitted through one or more of the voids 24 to backlight the characters 18, 20.

With continued reference to FIGS. 2 and 3, a lens layer 28 is arranged between the light source 26 and the decoration layer 22. In the examples illustrated, the lens layer 28 extends upwardly to generally fill the voids 24 between edges 32 of the decoration layer 22, and permits the transmission of light therethrough.

The lens layer 28 may be formed of a transparent (or at least semitransparent) material, for example a glass or plastic such as polycarbonate, polymethyl methacrylate (PMMA), or another suitable material. The lens layer 28 is depicted as a unitary structure, but may also be embodied as a set of structures, such as a set of layers. As will be discussed in more detail below, optical structures that may be a part of the lens layer 28 are included to reduce "halo" effects. The lens layer 28 may, but need not, converge, diverge, change the color of, or otherwise alter any one or more of the characteristics of the light transmitted through it.

In some examples, a gap layer 30 may be arranged between the light source 26 and the lens layer 28. In some examples, as shown in FIG. 2, the gap layer 30 may be air or otherwise devoid of solid material. This may be useful for example in the arrangement shown to provide physical clearance between the light source 26 and the lens layer 28 to allow room for the key 16 (with the character 18) to be depressed downwardly. In other examples, as shown in FIG. 3, the gap layer 30a may include or be formed of a solid, semi-solid, gel or liquid material (or combination of materials), such as an optically clear adhesive, to couple the light source 26 and the lens layer 28 while providing for the transmission of light out of the void 24 to backlight the character 20, and thereby providing a relatively robust and thin assembly.

To provide a sense of the magnitude of dimensions, and not intended to be limiting, in some examples the decoration layer 22 may have a thickness of about 0.05 mm to about 0.2 mm, the lens layer 28 may have a thickness of about 1.0 mm, the gap layer 30 may have a thickness of about 0.5 mm, and the void 24 may have a width of about 0.5 mm to about 2 mm.

The decoration layer 22, including the voids 24 forming the characters 18, 20, may be manufactured according to an in-mold decoration process in which different paints or layers are applied in sublayers to form the decoration layer 22. For instance, in some examples the decoration layer 22 may consist of up to seven sublayers, or more, and the topmost sublayer may be a UV protective coating. Once the decoration layer 22 is formed, the lens layer 28 may then be injection molded onto the decoration layer 22.

The UV protective coating may be transparent or semi-transparent, in which case the UV protective coating may also extend overtop of the lens layer 28, generally across the void 24.

Figure 4:
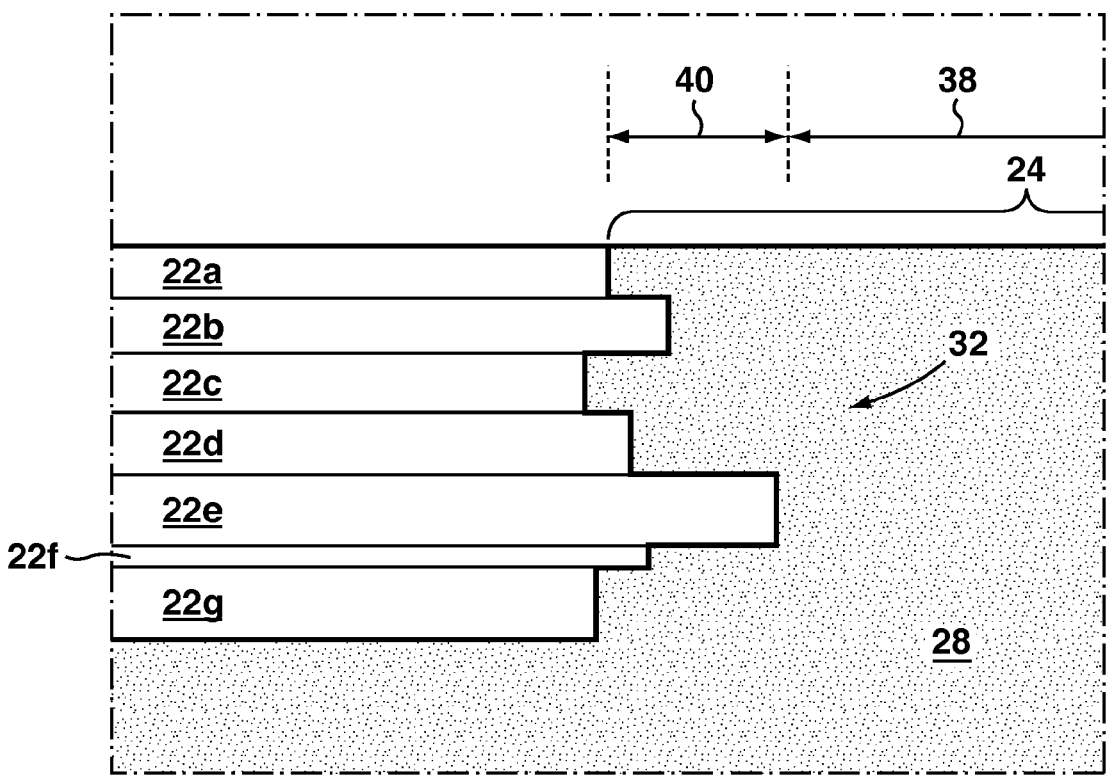
FIG. 4 is a schematic, sectional view of a decoration layer of the portable electronic device of FIG. 1.

Process limitations of the in-mold decoration process generally mean that reasonable alignment tolerances be assumed for each sublayer. For example, an alignment tolerance of +/−approximately 0.25 mm may be common for each sublayer. In other words, the edges 32 of the decoration layer 22, on either side of the void 24, may not be vertically aligned. This is schematically illustrated in FIG. 4, which shows the decoration layer formed of sublayers 22a, 22b, 22c, 22d, 22e, 22f, 22g that are misaligned (e.g. there is a lateral offset between at least some of the sublayers 22a-22g).

Often, as experience has demonstrated, a single layer of paint is not sufficient to block the passage of light, particularly where the paint has a lighter color (e.g., white, light grey, etc.) Thus, misalignment of the sublayers may lead to partial absorption of some light in the lens layer 28 adjacent to the edge 32 of the decoration layer 22.

Figure 5:
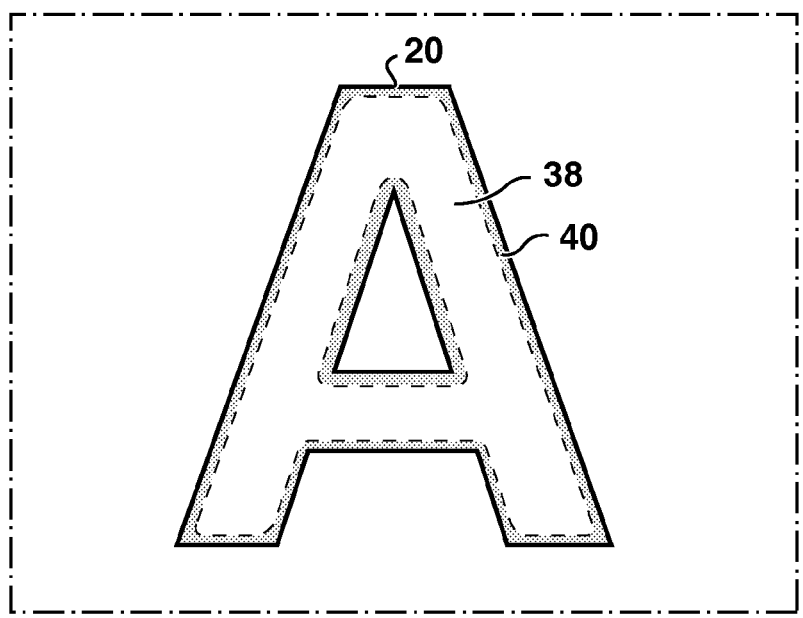
FIG. 5 is an overhead view a character of the portable electronic device of FIG. 1.

Consequently, the characters 18, 20 may not be uniformly lit across the voids 24 when they are backlit by the light source 26. In particular, as shown in FIG. 5, the character 20 may exhibit a central region 38 with a desired light intensity surrounded by a peripheral region 40 of reduced light intensity, also called a "halo". The central and peripheral regions 38, 40 of the void 24 are also shown in FIG. 4. In addition to misalignment of sublayers, other optical phenomena (such as reflection, refraction or diffraction) may contribute to varying degrees to the "halo".

Cosmetically or aesthetically, this "halo" effect may be undesirable. Furthermore, the halo may also make the visual information less legible, recognizable or identifiable. In particular, the halo effect may lead to a localized fuzziness that makes the character 20 visually more difficult to distinguish, and may also inhibit the ability to closely position the characters 20 together within a particular area (since the halo from one character may "bleed" into another character, thus interfering with the clarity of that other character).

Some of the concepts disclosed herein are directed at the reduction of such halo effects. In general, reduction of halo effects may be realized by incorporating optical structures with the lens layer 28 as described herein.

Figure 6:
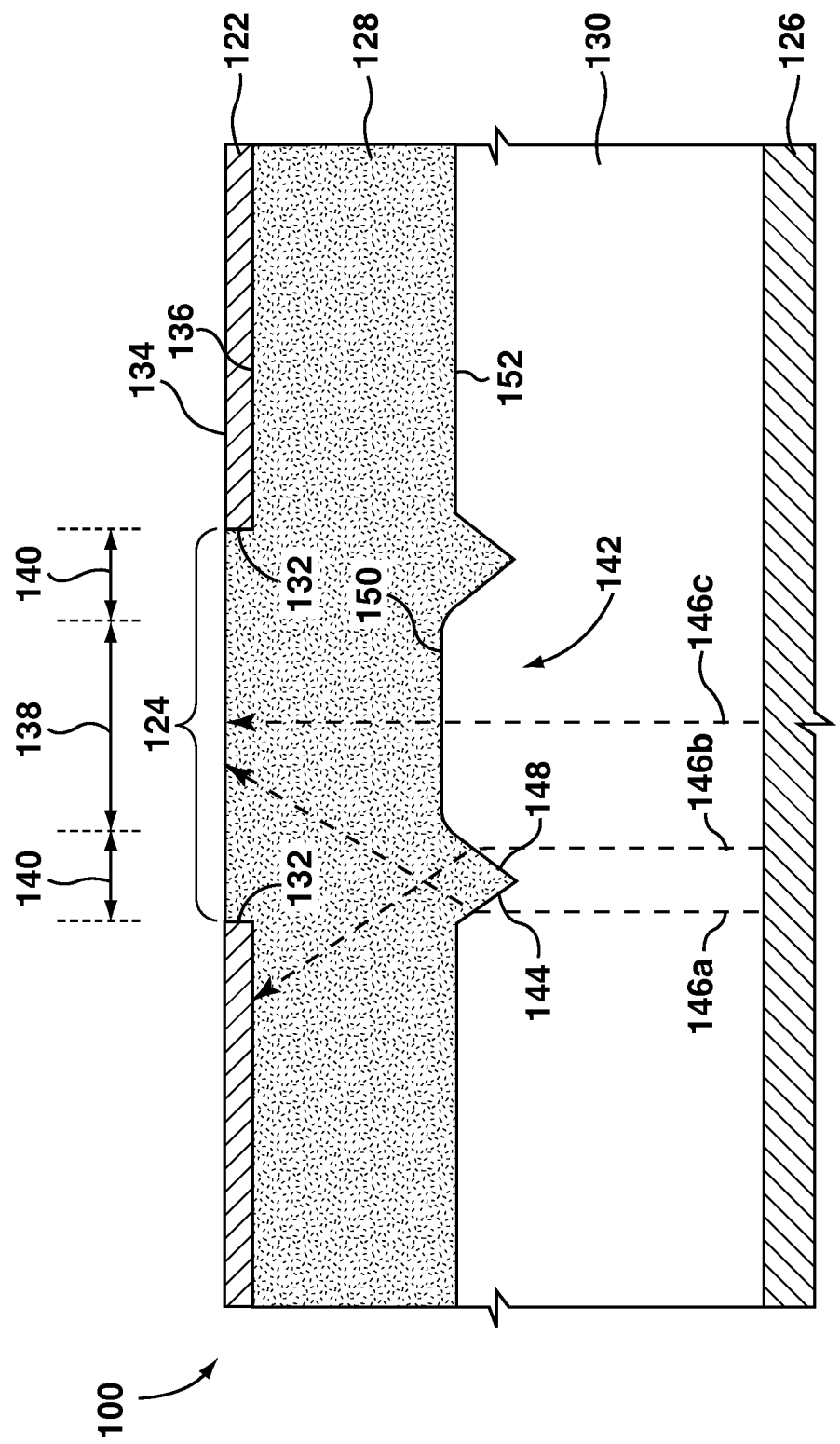
FIG. 6 is schematic, sectional view of a display arrangement according to one example.

Referring now to FIG. 6, a display arrangement 100 is shown to include a decoration layer 122, a lens layer 128, a gap layer 130 and a light source 126. The decoration layer 122 includes a top surface 134, a bottom surface 136, and at least one void 124 between the top and bottom surfaces 134, 136. That the void 124 is between the top and bottom surfaces 134, 136 of the decoration layer 122 means that there is a discontinuity or gap that extends through the thickness of the decoration layer 122. The void 124 is formed in the shape of a character when viewed from above the top surface 134. As shown in FIG. 6, the lens layer 128 may generally fill the void 124.

Generally, light rays (e.g., exemplary light rays 146a, 146b, 146c) are transmitted from the light source 126 towards the void 124. The void 124 includes a central region 138, and peripheral regions 140 adjoining the central region 138, adjacent to edges 132 of the decoration layer 122.

The display arrangement 100 also includes an optical structure indicated generally at reference numeral 142, which is shown formed as part of the lens layer 128. In other examples, the optical structure may be one or more separate elements coupled to the lens layer 128 (e.g., by adhesive) or adjacent the lens layer 128.

The optical structure 142 is arranged in alignment with the void 124 and is adapted to refract at least some of the light from the light source 126 away from the peripheral region 140 to reduce the halo effect. In other words, the optical structure 142 is positioned so as to "follow" or "track" the shape of the void 124 and is sized and shaped such that some light from the light source 126 that would otherwise be transmitted to the peripheral region 140 encounters the optical structure 142 and is directed away from the peripheral region 140.

In various examples, the optical structure 142 refracts at least some light either toward the central region 138 or toward the bottom surface 136 of the decoration layer, or both. By doing so, the optical structure 142 reduces intensity of light incident on the peripheral regions 140, which helps to provide a sharp contrast between the peripheral regions 140 and the central region 138 and reduce or even eliminate the halo effect.

In the example illustrated, the optical structure 142 is shown to extend generally below a bottom surface 152 of the lens layer 128 and includes a first angled face 144. The first angled face 144 refracts light rays incident on an outer first region of the lens layer 128 (e.g., as shown by exemplary light ray 146a) generally away from the peripheral region 140 and towards the central region 138.

By directing at least some light away from the peripheral region 140 towards the central region 138, the optical structure 142 may provide for greater illumination intensity per unit area in the central region 138. As a result, the display arrangement 100 may allow a reduction in the output requirements of the light source 126, or the driving current for the light source 126, or both (e.g., for cost or power savings).

The optical structure 142 also includes a second angled face 148. The second angled face 148 refracts light rays incident on an inner second region of the lens layer 128 (e.g., as shown by the exemplary light ray 146b) away from the peripheral region 140 and towards the (at least substantially opaque) bottom surface 136 of the decoration layer 122.

By directing at least some light away from the peripheral region 140 towards the decoration layer 122, the optical structure 142 may further help to eliminate the halo effect around the void 124.

The angled faces 144, 148 may bend light much as a prism. In many examples, chromatic dispersion may be of no concern or may be negligible, although in other examples this may be a design constraint.

Although the angled faces 144, 148 are depicted in FIG. 6 in two dimensions as having a pyramidal cross section, the angled faces in three dimensions may form, for example, straight ridges or rings or curves, or various other shapes and arrangements.

In some examples, the angled faces 144, 148 may generally follow the contours of the peripheral region 140. In other words, the periphery of the void 124 may be generally defined by the edges 132 of the decoration layer 122, and the angled faces 144, 148 may be generally aligned with the void 124 (or the edges 132), such that one or more of the angled faces 144, 148 are beneath the edges 132.

In various examples, even though an angled face may be beneath an edge, it is not necessary that any particular angled face be directly beneath any particular edge. When referring to an optical structure that is arranged in alignment with a void, therefore, what is referred to is an arrangement in which light traveling from the light source 126 and generally toward the peripheral region 140 may be diverted from its path by the optical structure 142.

As shown in FIG. 6, in this example the optical structure 142 includes a central planar section 150. The central planar section 150 is adapted to permit light rays incident on a central region of the lens layer 128 (e.g., as shown by the exemplary light ray 146c) to be transmitted on to the central region 138 of the void 124, generally without being disturbed. In the example illustrated, the central planar section 150 is arranged to be generally parallel to a plane defined by the bottom surface 152.

The shape and size of the optical structure 142 may vary depending on the size and shape of the material, and also on other properties such as the refractive index for the material. In particular, a higher refractive index may allow the features or dimensions of the optical structure to be relatively smaller, while a lower refractive index may lead to larger features or dimensions of the optical structures.

Accordingly, in various examples, angles of the faces 144, 148 may vary. For example, and not intended to be limiting, the first angled face 144 may be arranged so that the light ray 146a has an angle of incidence of 48 degrees, and the angle of refraction of the light ray 146a may be about 28 degrees. The second angled face 148 may be arranged so that the light ray 146b has an angle of incidence of 42 degrees, and the angle of refraction (of the light ray 146b) may be about 25 degrees. Various arrangements of the faces 133, 148 are possible.

Although depicted in FIG. 6 as being made as the same material as the lens layer 128, the faces 144, 148 need not be formed with the lens layer 128 as a unibody structure, and may be constructed from a different material, or may be physically coupled to (e.g., by adhesive) the lens layer 128 (or both).

Further, although the faces 144, 148 are shown to be generally planar, the optical structure 142 may be formed, partially, substantially, or even entirely, of curved surfaces adapted to refract at least some of the light from the light source 126 away from the peripheral region 140.

Moreover, the width of the peripheral region 140 may be generally a function of the understood tolerance of the in-mold decoration process, and will vary accordingly. For example, if the alignment tolerance is assumed to be +/−approximately 0.25 mm per sublayer of the decoration layer, then the width of the peripheral regions 140 may be set at about 0.35 mm to provide a reasonable width to prevent halo effects, while at the same time not giving up too much area to account for sublayer variation. On the other hand, the width of central region 138 may be set to larger or smaller values, or generally to any desired value.

During manufacturing of the display arrangement 100, relatively small and high accuracy tooling may be located within a larger mold to form the optical structure 142 on the lens layer 128, so that the optical structure 142 may be molded on the bottom surface 152 of the lens layer 128 during an injection molding process without additional steps.

Turning now to FIG. 7, illustrated therein is a display arrangement 200 according to another example. The display arrangement 200 includes an optical structure 242 which is shown to extend generally below a bottom surface 252 of a lens layer 228. The optical structure 242 includes a first angled face 244 arranged to refract light (as shown by exemplary light ray 246a) inwardly away from a peripheral region 240 and towards a central region 238. Conversely, a second angled face 248 is arranged to refract light (as shown by exemplary a light ray 246b) outwardly away from the peripheral region 240 and towards a bottom surface 236 of a decoration layer 222. A central planar section 250 permits a light ray 246c to be transmitted on to the central region 238 relatively undisturbed.

In the example illustrated, rounded portions are shown adjacent to the angled faces 244, 248. These may result from physical limitations of the injection molding process used to form the lens layer 228 with the optical structure 242. Alternatively, the rounded portions may be implemented in order to scatter light in a desired manner.

FIG. 8 shows a display arrangement 300 according to another example. The display arrangement 300 includes an optical structure 342 which is shown to partially extend below a bottom surface 352 of a lens layer 328. The optical structure 342 is bounded by a gap layer 330a, which may be formed of a material such as an optically clear adhesive, and which couples a light source 326 and a lens layer 328.

The optical structure 342 includes a first inwardly extending angled face 344 arranged to refract light (as evidenced by exemplary light ray 346a) inwardly away from a peripheral region 340 and towards a central region 338. A second angled face 348 extends outwardly from the bottom surface 352 and is arranged to refract light (as shown by the exemplary light ray 346b) outwardly away from the peripheral region 340 and towards a bottom surface 336 of a decoration layer 322. A central planar section 350 permits a light ray 346c to be transmitted on to the central region 338.

A computer simulation was conducted using ray tracing to compare the display arrangements 200, 300, as illustrated in FIGS. 7 and 8, respectively, with an arrangement having no optical structures. Numerical results of the computer simulation are provided in Table 1 below. The display arrangements 200, 300 were demonstrated to substantially reduce the intensity of light in the peripheral regions (e.g., reducing the "halo" effect), and also to increase the intensity in the central regions.

TABLE 1

Calculated luminous intensities.

| Arrangement | Light intensity in central region (cd/m2) | Light intensity in peripheral region (cd/m2) |
| --- | --- | --- |
| No optical structures | 22.0 | 10.3 |
| Display arrangement 200 | 27.9 | 4.6 |
| Display arrangement 300 | 31.8 | 3.6 |

In particular, the display arrangements 200, 300 provided approximately 27% and 45% increases in light intensity in the central region (respectively), and a reduction of −55% and −65% in the light intensity in the peripheral region (respectively).

Consequently, it has been learned by experimentation and simulation that, with manageable manufacturing tolerances, optical structures such as those described herein may reduce the halo and may make visual information more readily legible, recognizable or identifiable.

Advantages may be realized from the implementation of one or more examples, in addition to those already mentioned. The benefits of making visual information more readily legible, recognizable or identifiable may be achieved at modest cost and on a relatively small scale, with small or negligible effect upon size and weight. Consequently, the concepts described herein may be adapted to a variety of uses and devices, and may be especially useful for portable electronic devices in general, and for handheld devices, where considerations of size and weight are especially important.

Further, some examples may be useful with visual information presented with transflective elements, which may help to conserve power stored in a power pack, since in bright environments no backlighting may be required.

Other examples may be particularly useful in other applications, such as in automotive applications or for electronic appliances.

While the above description provides examples of one or more apparatuses and methods, it will be appreciated that other apparatuses and methods may be within the scope of the accompanying claims.

The invention claimed is:

1. A display arrangement, comprising:
   a decoration layer comprising a top surface, a bottom surface, and at least one void between the top and bottom surfaces, the void comprising a central region and a peripheral region adjoining the central region;
   a light source arranged underneath the bottom surface of the decoration layer, the light source adapted to transmit light through the void; and
   a lens layer arranged generally between the decoration layer and the light source, the lens layer being at least semi-transparent to permit transmission of the light through the void, the lens layer comprising an optical structure arranged in alignment with the void,
   wherein the optical structure directs light away from the peripheral region of the void to reduce intensity of the light in the peripheral region, and
   wherein the optical structure comprises at least one angled face arranged to refract the light away from the peripheral region.

2. The arrangement of claim 1, wherein the optical structure comprises at least one angled face arranged to refract the light towards the central region to reduce intensity of the light in a peripheral region.

3. The arrangement of claim 2, wherein the optical structure comprises a central planar section.

4. The arrangement of claim 1, wherein the optical structure comprises at least one angled face arranged to refract the light towards the bottom surface of the decoration layer to reduce intensity of the light in a peripheral region.

5. The arrangement of claim 1, wherein the optical structure comprises at least one angled face arranged to refract the light towards the central region, and at least one angled face arranged to refract the light towards the bottom surface of the decoration layer, to reduce intensity of the light in a peripheral region.

6. The arrangement of claim 1, further comprising a gap layer arranged between the light source and the lens layer.

7. The arrangement of claim 6, wherein the gap layer is formed of air, an adhesive, or a combination thereof.

8. The arrangement of claim 1, wherein the light source comprises at least one of:
   at least one light emitting diode and a light guide connected to the at least one light emitting diode; and
   an electroluminescent panel.

9. The arrangement of claim 1, wherein the decoration layer is formed as an external layer of a key or a button of a portable electronic device.

10. The arrangement of claim 1, wherein the decoration layer is formed as an external layer of an outer casing of a portable electronic device.

11. A display arrangement, comprising:
    a decoration layer comprising at least one void formed in the shape of a character when viewed from above;
    a light source arranged underneath the decoration layer, the light source adapted to transmit light through the void to backlight the character;
    a lens layer arranged above the light source, the lens layer being at least semi-transparent to permit transmission of the light through the void; and
    an optical structure arranged in alignment with the void, the optical structure comprising at least one angled face arranged to refract the light to reduce intensity of the light in a peripheral region of the void.

12. A portable electronic device, comprising:
    a decoration layer formed as an external layer of at least a portion of the portable electronic device, the decoration layer comprising a top surface, a bottom surface, and at least one void between the top and bottom surfaces, the void formed in the shape of a character when viewed from above the top surface;
    a light source arranged underneath the bottom surface of the decoration layer, the light source adapted to transmit light through the void to backlight the character; and
    an optical structure arranged generally between the decoration layer and the light source and in alignment with the void, the optical structure adapted to reduce intensity of the light in a peripheral region of the void.

* * * * *